United States Patent
Aschauer et al.

(10) Patent No.: US 11,845,343 B2
(45) Date of Patent: Dec. 19, 2023

(54) DEVICE AND METHOD FOR CONTROLLING A CURRENT COLLECTOR FOR A VEHICLE

(71) Applicant: Siemens Mobility Austria GmbH, Vienna (AT)

(72) Inventors: Guilherme Aschauer, Vienna (AT); Christian Saliger, Vienna (AT); Roman Horak, Velm (AT); Walter Reichardt, Breitenbrunn (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 588 days.

(21) Appl. No.: 17/043,499

(22) PCT Filed: Mar. 30, 2018

(86) PCT No.: PCT/EP2018/058296
§ 371 (c)(1),
(2) Date: Sep. 29, 2020

(87) PCT Pub. No.: WO2019/185166
PCT Pub. Date: Oct. 3, 2019

(65) Prior Publication Data
US 2021/0053446 A1    Feb. 25, 2021

(51) Int. Cl.
*B60L 5/28*    (2006.01)
*B60L 5/24*    (2006.01)
(Continued)

(52) U.S. Cl.
CPC ................... *B60L 5/28* (2013.01); *B60L 5/24* (2013.01); *B60L 5/32* (2013.01); *G01L 1/246* (2013.01); *B60L 2200/26* (2013.01)

(58) Field of Classification Search
CPC ...... B60L 5/00; B60L 5/16; B60L 5/24; B60L 5/26; B60L 5/28; B60L 5/32; B60L 5/36;
(Continued)

(56) References Cited

FOREIGN PATENT DOCUMENTS

CN    101081598    12/2007
CN    106476629 A *  3/2017
(Continued)

OTHER PUBLICATIONS

PCT International Search Report dated Dec. 17, 2018 based on PCT/EP2018/058296 filed Mar. 30, 2018.
(Continued)

*Primary Examiner* — Zachary L Kuhfuss
*Assistant Examiner* — Cheng Lin
(74) *Attorney, Agent, or Firm* — Cozen O'Connor

(57) ABSTRACT

A device and method for controlling a pneumatically actuated current collector for a vehicle, wherein the device includes a controlled system having a first pressure controller, a second pressure controller, and an actuation device, where at least one sensor, which is connected for signal conduction to a contact force controller of the controlled system, can be advantageously arranged on the current collector, the first pressure controller is coupled to the contact force controller, the second pressure controller and a pressure supply for signal conduction, the second pressure controller having a connection point for an actual pilot pressure from the first pressure controller, and signal-conducting connections are provided between the second pressure controller and the pressure supply and between the second pressure controller and the actuation device such that rapid adaptation of a contact force to variable operating conditions is enabled.

15 Claims, 2 Drawing Sheets

(51) Int. Cl.
*G01L 1/24* (2006.01)
*B60L 5/32* (2006.01)

(58) Field of Classification Search
CPC ...... B60L 5/38; B60L 5/39; B60L 5/40; B60L 2200/26; G01L 1/246
See application file for complete search history.

(56) References Cited

FOREIGN PATENT DOCUMENTS

| | | | |
|---|---|---|---|
| DE | 19540913 | | 2/1997 |
| DE | 10126042 | | 1/2002 |
| DE | 10126042 A1 * | | 1/2002 |
| DE | 10249896 | | 5/2004 |
| DE | 102013217429 | | 3/2015 |
| DE | 102013217429 A1 * | | 3/2015 |
| DE | 102014111264 A1 * | | 2/2016 |
| DE | 102015122221 | | 6/2017 |
| EP | 1862347 | | 12/2007 |
| EP | 1862347 A1 * | | 12/2007 |
| EP | 1975584 | | 10/2008 |
| EP | 1975584 A2 * | | 10/2008 |
| FR | 2846415 A1 * | | 4/2004 |
| JP | 2007-274792 | | 10/2007 |
| RU | 115725 U | | 5/2012 |
| WO | 2004026615 | | 4/2004 |
| WO | WO-2004026615 A1 * | | 4/2004 |

OTHER PUBLICATIONS

Office Action (and a German translation) dated Mar. 10, 2021 issued in Russian Patent Application No. 2020134312/11.

* cited by examiner

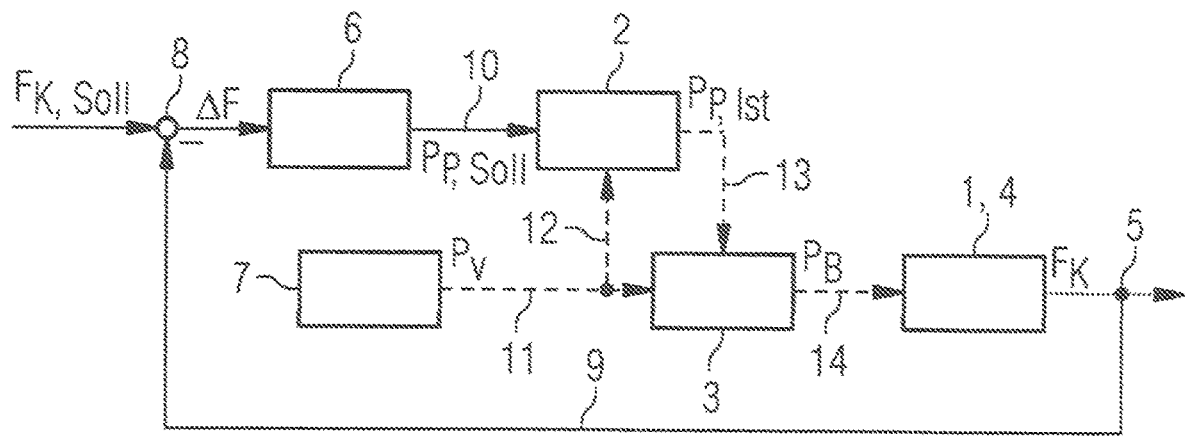
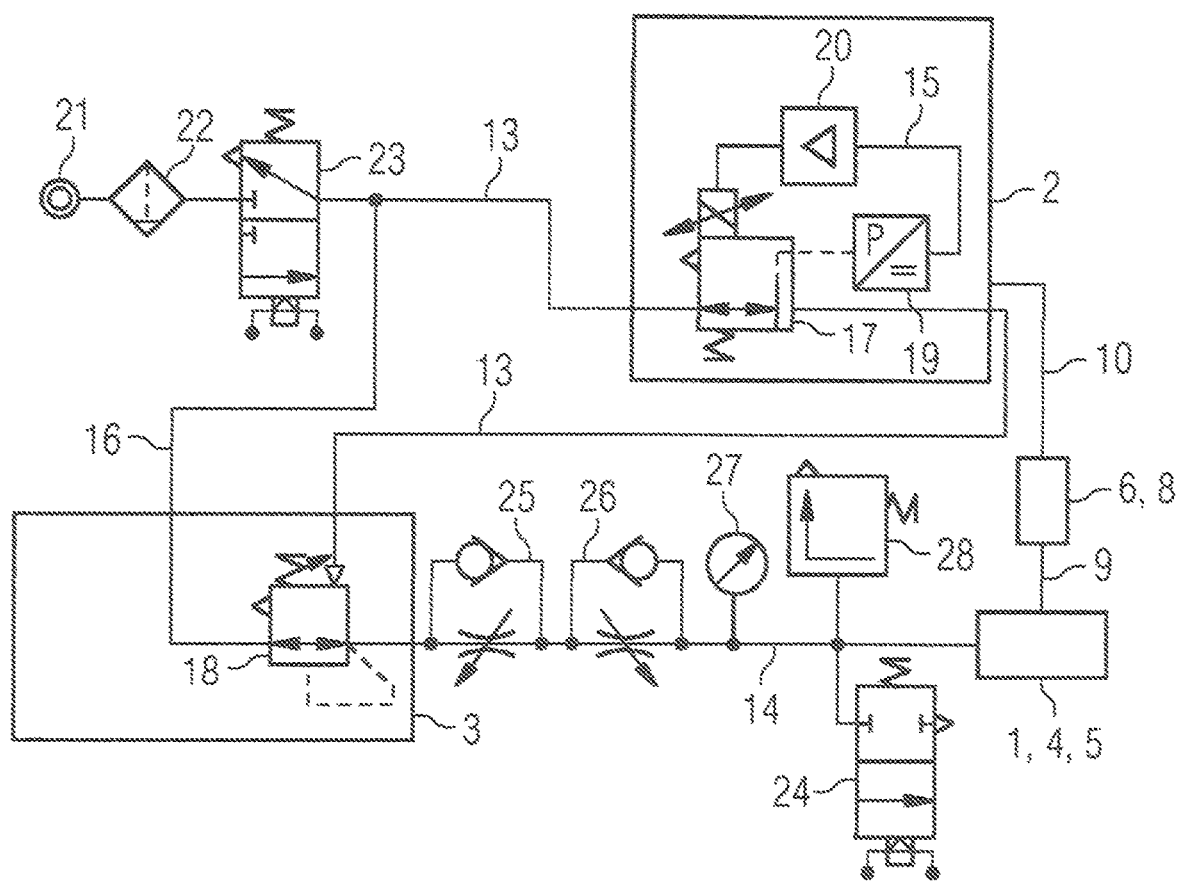

DEVICE AND METHOD FOR CONTROLLING A CURRENT COLLECTOR FOR A VEHICLE

CROSS-REFERENCE TO RELATED APPLICATIONS

This is a U.S. national stage of application No. PCT/EP2018/059296 filed 30 Mar. 2018.

BACKGROUND OF THE INVENTION

1. Field of the Invention

The invention relates to a device for controlling a pneumatically actuated current collector for a vehicle having a control system that includes a first pressure controller, a second pressure controller and an actuation device.

2. Description of the Related Art

In order to reduce or to avoid wear or damage to wearing parts of current collectors, it is necessary to precisely control contact forces between these wearing parts and an overhead wire or a current rail, etc. High contact forces bring about wear due to heavy friction between the wearing part and the overhead wire or current rail, while excessively low contact forces bring about arcs between the wearing part and the overhead wire or current rail, thereby again causing wear. Standards (for example, European Standard 50367) specify permissible contact force ranges as a function of a travel speed.

Current collector contact forces are often set using aerodynamic forces that are influenced by smoke deflector plates.

Current collectors with pneumatic pressure control are also known.

EP 1 862 347 B1 thus describes, for example, a control device and a control method for a current collector actuated via bellows, where the control device has a pressure controller. A pressure setpoint value is set based on pressure signals and speed signals measured via a sensor. This pressure setpoint value is preset mechanically, and dynamic adjustments to the presets are performed pneumatically.

EP 1 975 584 B1 also discloses a device and method for measuring contact force between a current collector and an overhead wire. A contact force sensor designed as a strain sensor and a force measurement cell are also provided, as a result of which both static and dynamic contact forces are able to be measured and evaluated synchronously. Here, force measurement cell is designed such that temperature influences on the contact forces caused by a characteristic sensor response behavior can be excluded from a contact force evaluation, i.e., results of the contact force evaluation are not influenced by temperature changes.

In their known forms, the afore-mentioned approaches have the disadvantage that there is no way to control a current collector either on the basis of a contact force or on the basis of a pressure.

SUMMARY OF THE INVENTION

In view of the foregoing, it is therefore an object of the invention to provide a device that is more sophisticated in comparison with the prior art and is particularly precise and also redundant and therefore more reliable, as well as to provide a more sophisticated method for controlling a current collector.

These and other objects and advantages are achieved in accordance with the invention by a device for controlling a pneumatically actuated current collector of the type mentioned at the outset, where at least one sensor that is connected to a contact force controller of the control system in a signal-conducting manner can be arranged on the current collector, the first pressure controller is coupled to the contact force controller, the second pressure controller and a pressure supply in a signal-conducting manner, wherein the second pressure controller has a port for an actual pilot pressure from the first pressure controller, and where signal-conducting connections are provided between the second pressure controller and the pressure supply and are also provided between the second pressure controller and the actuation device.

Contact force setting or contact force adjustment for the current collector may then occur, on the basis of the sensor and the contact force controller connected thereto, even if non-measurable operating conditions (for example, aerodynamic influences) cause a change in contact force that requires a correction, such that reliable and low-wear operation of the current collector is guaranteed. In addition to the contact force controller and the first pressure controller, provision is made for the second pressure controller, thereby achieving a certain redundancy and thus increased operating reliability. Particular effectiveness of this redundancy is achieved when the contact force controller, the first pressure controller and the second pressure controller are fed via energy supply devices using different physical principles.

In the case of defects, faults or failures with the contact force controller and/or the first pressure controller, the second pressure controller provides a minimum pressure and, thus, a minimum contact force between the current collector and the overhead wire or the current rail, thereby continuing to guarantee reliable current collection.

The actual pilot pressure port on the second pressure controller furthermore means that a minimum pressure (i.e., a pressure not able to be dropped below) set via the second pressure controller can be temporarily increased in order to be able to respond rapidly to dynamic contact force fluctuations (for example, caused by aerodynamic influences, or non-uniform overhead wire profiles), i.e., to be able to rapidly provide sufficient contact force between the current collector and overhead wire or current rail.

On account of the contact force controller, certain measurement runs for adjusting current collector smoke deflector plates, which influence the contact force between the current collector and the overhead wire, in the certification process for the rail vehicle may be shortened or dispensed with, because the contact force controller ensures precise contact force control and the current collector smoke deflector plates need to be dimensioned only roughly.

The contact force control furthermore achieves reduced wear of the current collector and the overhead wire, as a result of which maintenance and servicing intervals can be extended.

It is expedient if the at least one sensor is configured as a strain sensor arranged on a wearing part of the current collector. This measure achieves a simple and robust determination of contact forces. If the strain sensor is configured as an optical sensor (for example, as a fiber Bragg grating sensor), then this achieves particularly high measurement sensitivity that makes it possible to measure very low strains. Optical sensors may furthermore also be arranged in high-voltage environments, i.e., directly on the current collector, for example.

In an advantageous embodiment, contact forces are stored in a data memory of the contact force controller. This measure allows an immediate or time-delayed evaluation of the contact forces or of contact force profiles. Damage to the overhead wire or to the current collector is thereby able to be detected.

In an expedient embodiment, characteristic curves are implemented in the contact force controller. These characteristic curves, for example, specify pressures or setpoint contact forces as a function of the travel speed of the rail vehicle for the contact force controller. This measure allows particularly precise contact force control and monitoring of measured contact forces. The contact force control furthermore thereby remains functional, at least in the form of restricted, i.e., purely characteristic curve-based control, even in the case of a defect, or a fault, with the sensor or a measurement chain.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with reference to exemplary embodiments, in which:

FIG. 1 shows an exemplary block diagram of a device for controlling a current collector in accordance with an embodiment of the invention;

FIG. 2 shows an exemplary circuit diagram of a device for controlling a current collector in accordance with an embodiment of the invention.

DETAILED DESCRIPTION OF THE EXEMPLARY EMBODIMENTS

Figure 3:
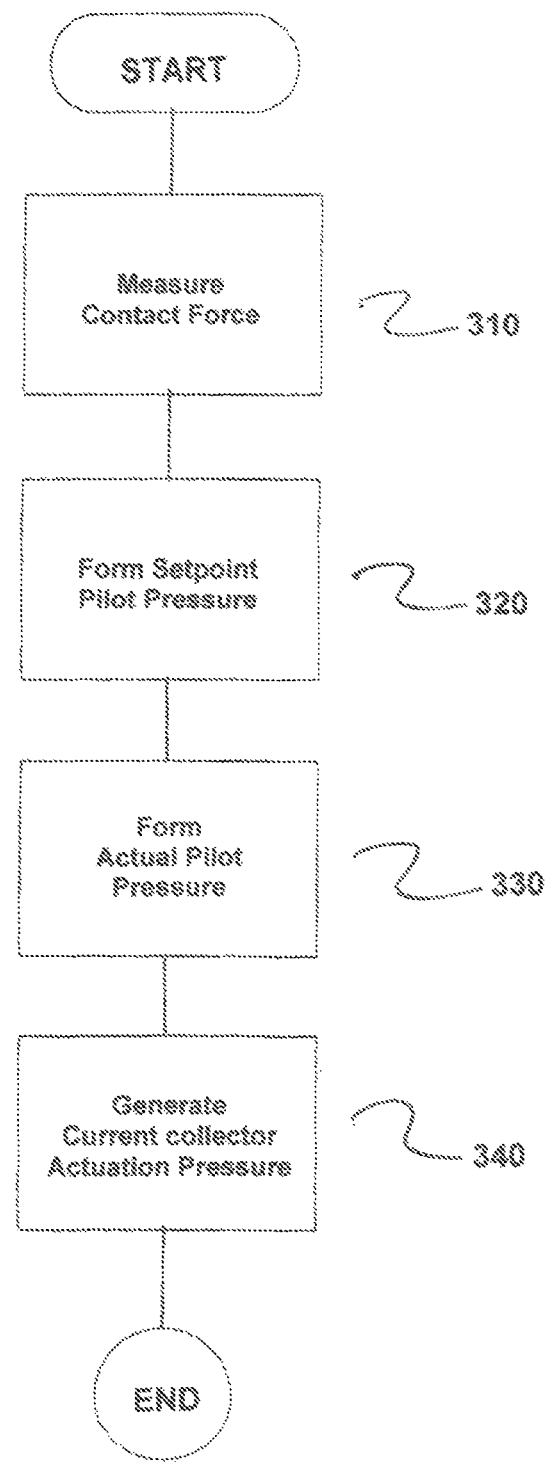
FIG. 3 is a flowchart of the method in accordance with the invention.

FIG. 1 shows an exemplary block diagram of a device in accordance with an embodiment of the invention for controlling a current collector 1, which can be lifted and lowered via an actuation device 4, of a rail vehicle (not shown), which is configured as a crossbeam current collector or pantograph. An electropneumatic first pressure controller 2, a mechanopneumatic second pressure controller 3 and an electronic contact force controller 6 are provided along a control system of a cascade controller.

The current collector 1 and the device for controlling the current collector 1 are arranged in part on and in part in a car body of the rail vehicle.

A sensor 5 configured as a conventional optical fiber Bragg grating sensor (strain sensor) is provided to measure a contact force $F_K$ between the current collector 1 and an overhead wire (not shown). This sensor is arranged on a strain element (not illustrated). The strain element is arranged between a support frame (not shown) that is connected to an upper side of the current collector 1, and a wearing part, which is likewise not illustrated for purposes of clarity, makes contact with the overhead wire. The contact force $F_K$ occurring between the current collector 1 and the overhead wire brings about a strain, proportional thereto, on the strain element and thus a strain, proportional to the contact force $F_K$, on the sensor 5.

This strain is converted into the contact force $F_K$ via a conventional physical/mathematical relationship (Hook's law) between the strain, a modulus of elasticity, a tension, a surface area and the contact force $F_K$ and forwarded to a contact force controller 6 as contact force signal via an electrical first line 9 and via a comparison member 8.

In accordance with the invention, it is also conceivable to transmit a signal generated by the sensor 5 directly to the contact force controller 6, i.e., as an optical signal, where the first line 9 is formed as an optical line for this purpose.

A difference contact force $\Delta F$ that functions as a control difference is formed via the comparison member 8 from a feedback of the contact force $F_K$ and a setpoint contact force $F_{K,setpoint}$ which functions as a reference variable.

A setpoint pilot pressure $p_{P,setpoint}$ is formed in the contact force controller 6 from the difference contact force $\Delta F$ as specification for a temporary pressure or contact force increase based on a base pressure $p_A$ to be set via the second pressure controller 3 and functioning as a minimum pressure.

The difference contact force $\Delta F$ is converted in a computing unit (not shown) of the contact force controller 6 into the setpoint pilot pressure $p_{P,setpoint}$ via known relationships, implemented in the computing unit, between the difference contact force $\Delta F$, a characteristic first surface area of the actuation device 4, further parameters of the actuation device 4, a characteristic second surface area between the wearing part and the overhead wire, efficiencies (for example, efficiency of a current collector frame (not shown)) and the setpoint pilot pressure $p_{P,setpoint}$, and transmitted to the first pressure controller 2 via an electrical second line 10.

In accordance with the invention, it is also conceivable for the computing unit assigned to the contact force controller 6 to be arranged spatially separately from the contact force controller 6 and to be connected to the contact force controller 6 via corresponding line paths.

A control algorithm is implemented in the contact force controller 6 and is used to switch the first pressure controller 2 such that absolute values of the difference contact force $\Delta F$ are minimized.

The first pressure controller 2 is configured as an electropneumatic controller. The setpoint pilot pressure $p_{P,setpoint}$ which is transmitted to the first pressure controller 2 as electrical signal, is converted into a pneumatic signal via this first pressure controller 2.

The first pressure controller 2 is connected, via a supply pressure port 21 shown in FIG. 2 and a pneumatic third line 11 and a pneumatic fourth line 12, to a pressure supply 7 that has a compressor, not illustrated, and in which a supply pressure $p_V$ prevails.

An actual pilot pressure $p_{P,actual}$ which is transmitted to the second pressure controller 3 via a pneumatic fifth line 13, is formed as specification variable from the supply pressure $p_V$ via the electrical signal from the setpoint pilot pressure $p_{P,setpoint}$.

The second pressure controller 3 is configured as a mechanopneumatic controller. The second pressure controller 3 is connected to the pressure supply 7 via the supply pressure port 21 and the third line 11, and has a handwheel. The base pressure $p_A$ is set from the supply pressure $p_V$ using the handwheel. A current collector actuation pressure $p_B$ is formed, where the base pressure $p_A$ is increased by the actual pilot pressure $p_{P,actual}$, giving the current collector actuation pressure $p_B$ as the total pressure or proportional pressure.

This current collector actuation pressure $p_B$ is transferred, via a pneumatic sixth line 14, to the actuation device 4 of the current collector 1, which is configured as a conventional pneumatic device having bellows (not shown). Pressure changes in the bellows cause the current collector 1 to lift or lower, and the contact force $F_K$ between the current collector 1 and the overhead wire thus increases or decreases.

Contact forces $F_K$ measured by the sensor 5 are stored in the computing unit of the contact force controller 6 and transmitted to a maintenance station for evaluation via a radio interface of the computing unit having an antenna.

The computing unit has a time recording device and is connected to a global positioning system (GPS) receiver (not shown) of the rail vehicle. The contact forces $F_K$ are therefore stored together with timestamps and location stamps that are associated with the contact forces $F_K$. It is thereby possible, based on the stored contact forces $F_K$ or contact force profiles formed therefrom, to perform temporal and location-based detection of damage to the current collector 1 and/or the overhead wire.

In accordance with the invention, it is also conceivable for the evaluation to occur directly in the computing unit.

If, for example, the contact force $F_K$ drops below a defined threshold value, then a warning event is generated in the computing unit, transmitted as warning signal to a driver's cabin of the rail vehicle via a signal line (not illustrated), and displayed there as warning indication on a display.

In the event of a defect with or failure of the sensor 5 or in the case of other faults, the setpoint pilot pressure $p_{P,setpoint}$ is formed via setpoint pressure characteristic curves that are implemented in the computing unit of the contact force controller 6 as a mathematical relationship between setpoint pilot pressures $p_{P,setpoint}$ and travel speeds.

The computing unit comprises a power supply device, independent of other components of the contact force controller 6, and therefore remains active in the case of a defect, a failure or events such as damage to the contact force controller 6, and transfers setpoint pilot pressures $p_{P,setpoint}$ to the first pressure controller 2 via the setpoint pressure characteristic curves.

The setpoint pressure characteristic curves specify setpoint pilot pressures $p_{P,setpoint}$ as a function of travel speeds. The computing unit is connected to a travel speed measurement device (not illustrated) of the rail vehicle. The setpoint pilot pressure $p_{P,setpoint}$ appropriate for the measured travel speed is determined via a measured travel speed and the mathematical relationship between setpoint pilot pressures $p_{P,setpoint}$ and travel speeds, and is transmitted to the first pressure controller 2 via the second line 10.

The current collector 1 is configured as a pantograph in this exemplary embodiment. In accordance with the disclosed embodiments of the invention, however, it is also conceivable for the current collector 1 to be configured, for example, as a diamond pantograph, a side pantograph for a current rail or as another device of a vehicle that is guided on an overhead wire. The current collector 1 may be arranged on rail vehicles, but also on other vehicles, such as for example electric buses or electric trucks.

FIG. 2 illustrates a pneumatic circuit diagram of that exemplary embodiment of the device in accordance with the invention for controlling a current collector 1 that is also shown in FIG. 1. The same reference signs are therefore used in part.

The device for controlling the current collector 1 and the current collector 1 itself are arranged on a rail vehicle (not illustrated).

The current collector 1 has a pneumatic actuation device 4 and a sensor 5 designed as a strain sensor, these being described in connection with FIG. 1.

Measurement signals with respect to a contact force $F_K$ of the sensor 5 are transferred to an electronic contact force controller 6 with a comparison member 8 via an electrical first line 9 and are converted into a setpoint pilot pressure $p_{P,setpoint}$ via the contact force controller 6.

The setpoint pilot pressure $p_{P,setpoint}$ is transmitted to a known first pressure controller 2 via an electrical second line 10.

The first pressure controller 2 is configured as an electropneumatic controller and has a first pressure control valve 17, actuated via an adjustable magnetic coil, with a spring return mechanism and an aeration mechanism, a pressure sensor 19 and a setting element 20, which are connected to one another via a seventh line 15.

The first pressure controller 2 is connected to a pressure supply 7, illustrated in FIG. 1, via a supply pressure port 21.

The first pressure control valve 17 is driven via the pressure sensor 19 and the setting element 20, and an actual pilot pressure $p_{P,actual}$ is thus formed based on a base pressure $p_A$ provided from a supply pressure $p_V$ via a first strand of a pneumatic fifth line 13 by a known second pressure controller 3 and the setpoint pilot pressure $p_{P,setpoint}$. The actual pilot pressure $p_{P,actual}$ is transmitted to a port of a second pressure control valve 18 of the second pressure controller 3 via a second strand of the fifth line 13.

The second pressure controller 3 has a handwheel, which is illustrated as a spring symbol of the second pressure control valve 18 in FIG. 2, and is connected to the pressure supply 7 via the supply pressure port 21. The base pressure $p_A$ is set from the supply pressure $p_V$ via the handwheel, such as by a traction unit driver in a driver's cabin of the rail vehicle.

The supply pressure $p_V$ is fed into the first strand of the fifth line 13 or into an eighth line 16 via a filter 22 and a first way valve 23, which is configured as a pilot-controlled 3/2 way valve.

The eighth line 16 and the first strand of the fifth line 13 correspond to a third line 11 and a fourth line 12, which are shown in FIG. 1.

The first way valve 23 has a spring return mechanism and an aeration mechanism, via which the first strand of the fifth line 13 or the eighth line 16 are able to be aerated.

The base pressure $p_A$ is transmitted to the settable second pressure control valve 18, which has an aeration mechanism, via the eighth line 16. A current collector actuation pressure $p_B$ is formed in the second pressure control valve 18 from the base pressure $p_A$ and the actual pilot pressure $p_{P,actual}$ transmitted via the second strand of the fifth line 13 and fed into the second pressure control valve 18 via the port. The current collector actuation pressure $p_B$ is transmitted to bellows of the actuation device 4 of the current collector 1 via a sixth line 14 and a settable first throttle check valve 25 and a settable second throttle check valve 26 with free flows in a respective direction, and converted into a lifting or lowering procedure of the current collector 1 by the actuation device 4.

Lifting and lowering times of the current collector 1 can be set via the first throttle check valve 25 and the second throttle check valve 26.

The sixth line 14 furthermore has a known pressure measurement device 27, a known safety valve 28 and a second way valve 24.

With the safety valve 28, which is configured for a pressure threshold value of 6 bar and has a spring return mechanism and an aeration mechanism, excess pressures of greater than 6 bar in the sixth line 14, and thus damage (for example to the bellows of the actuation device 4), are avoided.

Rapid lowering of the current collector 1 is achieved in the case of a corresponding switching operation via the second way valve 24, which is configured as a pilot-controlled 2/2 way valve with a spring return mechanism and an aeration mechanism.

FIG. 3 is a flowchart of a control method for a device for controlling a pneumatically actuated current collector (1) for a vehicle. The method comprises measuring a contact force $F_K$ acting between the pneumatically actuated current collector 1 and an overhead wire via at least one sensor 5, as indicated in step 310.

Next, a setpoint pilot pressure pP,setpoint is formed from the measured contact force FK and a setpoint contact force FK,setpoint via a contact force controller 6, as indicated in step 320.

Next, an actual pilot pressure pP,actual is formed from the setpoint pilot pressure pP,setpoint via a first pressure controller 2 by setting a supply pressure pV of the pressure supply 7, as indicated in step 330.

Next, a current collector actuation pressure pB is generated via a second pressure controller 3 from a base pressure pA set via the supply pressure pV and the actual pilot pressure pP,actual, as indicated in step 340.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for controlling a pneumatically actuated current collector for a vehicle, the device comprising:
   a control system having a first pressure controller, a second pressure controller and an actuation device;
   at least one sensor connected to a contact force controller of the control system in a signal-conducting manner and arrangeable on the pneumatically actuated current collector,
   wherein the first pressure controller is directly coupled to the contact force controller, directly coupled to the second pressure controller and directly coupled to a pressure supply in a signal-conducting manner;
   wherein the second pressure controller has a port for an actual pilot pressure from the first pressure controller; and
   wherein signal-conducting connections are provided between the second pressure controller and the pressure supply, and are provided between the second pressure controller and the actuation device.

2. The device as claimed in claim 1, wherein the contact force controller comprises an electronic controller; and wherein electrical line paths are provided between the contact force controller and the at least one sensor, and are provided between the contact force controller and the first pressure controller.

3. The device as claimed in claim 2, wherein the first pressure controller comprises an electropneumatic controller; and wherein pneumatic line paths are provided between the first pressure controller and the pressure supply, and are provided between the first pressure controller and the second pressure controller.

4. The device as claimed in claim 2, wherein contact forces are stored in a data memory of the contact force controller.

5. The device as claimed in claim 2, wherein characteristic curves are implemented in the contact force controller.

6. The device as claimed in claim 1, wherein the contact force controller comprises an electronic controller; and wherein optical line paths are provided between the contact force controller and the at least one sensor, and electrical line paths are provided between the contact force controller and the first pressure controller.

7. The device as claimed in claim 6, wherein the first pressure controller comprises an electropneumatic controller; and wherein pneumatic line paths are provided between the first pressure controller and the pressure supply, and are provided between the first pressure controller and the second pressure controller.

8. The device as claimed in claim 1, wherein the first pressure controller comprises an electropneumatic controller; and wherein pneumatic line paths are provided between the first pressure controller and the pressure supply, and are provided between the first pressure controller and the second pressure controller.

9. The device as claimed in claim 1, wherein the second pressure controller comprise a mechanopneumatic controller; and wherein pneumatic line paths are provided between the second pressure controller and the pressure supply, and are provided between the second pressure controller and the actuation device.

10. The device as claimed in claim 1, wherein the at least one sensor comprises a strain sensor arranged on a wearing part of the current collector.

11. A current collector having the device as claimed in claim 1.

12. A control method for a device for controlling a pneumatically actuated current collector for a vehicle, the method comprising:
    measuring a contact force acting between the pneumatically actuated current collector and an overhead wire via at least one sensor;
    forming a setpoint pilot pressure from the measured contact force and a setpoint contact force via a contact force controller;
    forming an actual pilot pressure from the setpoint pilot pressure via a first pressure controller by setting a supply pressure of a pressure supply; and
    generating a current collector actuation pressure via a second pressure controller from a base pressure set via the supply pressure and the actual pilot pressure;
    wherein the first pressure controller is directly coupled to the contact force controller, directly coupled to the second pressure controller and directly coupled to the pressure supply in a signal-conducting manner.

13. The control method as claimed in claim 12, further comprising:
storing the measured contact force in a memory of the contact force controller.

14. The control method as claimed in claim 13, wherein the setpoint pilot pressure is formed via the characteristic curves implemented in the contact force controller.

15. The control method as claimed in claim 12, wherein the setpoint pilot pressure is formed via the characteristic curves implemented in the contact force controller.

\* \* \* \* \*